United States Patent
Aoyama

(10) Patent No.: US 7,544,235 B2
(45) Date of Patent: Jun. 9, 2009

(54) INK FOR INK-JET RECORDING

(75) Inventor: Michiko Aoyama, Nagoya (JP)

(73) Assignee: Brother Kogyo Kabushiki Kaisha (JP)

( * ) Notice: Subject to any disclaimer, the term of this patent is extended or adjusted under 35 U.S.C. 154(b) by 0 days.

(21) Appl. No.: 12/133,079

(22) Filed: Jun. 4, 2008

(65) Prior Publication Data

US 2008/0295730 A1 Dec. 4, 2008

(30) Foreign Application Priority Data

Jun. 4, 2007 (JP) .............................. 2007-148004

(51) Int. Cl.
C09D 11/02 (2006.01)
(52) U.S. Cl. .............. 106/31.43; 106/31.49; 106/31.75; 106/31.78
(58) Field of Classification Search .............. 106/31.43, 106/31.75, 31.49, 31.78
See application file for complete search history.

(56) References Cited

U.S. PATENT DOCUMENTS 5,741,354 A * 4/1998 Kawasumi et al. ....... 106/31.85
6,514,330 B1 2/2003 Kanaya et al.
7,297,198 B1 * 11/2007 Taga et al. ............... 106/31.49
7,303,617 B1 * 12/2007 Taga et al. ............... 106/31.49
7,303,618 B1 * 12/2007 Taga et al. ............... 106/31.49
7,393,399 B2 * 7/2008 Taga et al. ............... 106/31.78

FOREIGN PATENT DOCUMENTS

| JP | 05-098205 | 4/1993 |
| JP | 05-239390 | 9/1993 |
| JP | 06-016982 | 1/1994 |
| JP | 2000-355665 | 12/2000 |
| JP | 2004-292574 | 10/2004 |
| JP | 2005-350583 | 12/2005 |

OTHER PUBLICATIONS

English translation of JP 05/098205, Apr. 1993.*

* cited by examiner

*Primary Examiner*—Helene Klemanski
(74) *Attorney, Agent, or Firm*—Banner & Witcoff, Ltd.

(57) ABSTRACT

An ink for ink-jet recording is provided which, although contains free copper ions, has anticorrosive properties and is free from the formation of a precipitate caused by the free copper ion. The ink for ink-jet recording containing the free copper ion includes cyclohexylammonium carbamate serving as an anticorrosive.

5 Claims, 1 Drawing Sheet

INK FOR INK-JET RECORDING

CROSS REFFERENCE TO RELATED APPLICATION

The present invention claims a priority from Japanese Patent Application No. 2007-148004, which was filed on Jun. 4, 2007, the disclosure of which is herein incorporated by reference in its entirety.

BACKGROUND

1. Field of the Invention

The present invention relates to an ink for ink-jet recording.

2. Description of the Related Art

A copper complex coloring agent, such as a copper phthalocyanine dye, a copper phthalocyanine pigment and the like, is used as a cyan coloring agent for an ink for ink-jet recording.

Generally, an anticorrosive, such as benzotriazole and the like, is used in inks for ink-jet recording, in order to prevent corrosion of a metal material in contact with the ink in an ink passage of an ink-jet head.

When benzotriazole is added to an ink for ink-jet recording comprising a copper complex coloring agent, the benzotriazole is coordinated to free copper ions released from the copper complex coloring agent, and a precipitate is formed in the ink. This causes a problem that nozzles of an ink-jet head are clogged. This problem is particularly significant when the concentration of the free copper ions released from the copper complex coloring agent in the ink for ink-jet recording is 0.01 ppm or more.

In view of the above, an ink for ink-jet recording has been proposed in which the free copper ion concentration in the ink is reduced to 10 ppm or less by improving the degree of purification of a copper complex coloring agent or by using a sequestering agent.

However, it is difficult to purify the copper complex coloring agent to the extent that a precipitate caused by free copper ions is not formed. Moreover, the use of the sequestering agent in addition to the anticorrosive may adversely affect the components of an ink-jet head.

SUMMARY

An aspect of the present invention provides an ink for ink-jet recording comprising a free copper ion, comprising cyclohexylammonium carbamate serving as an anticorrosive.

DESCRIPTION OF THE PREFERRED EMBODIMENTS

Figure 1:
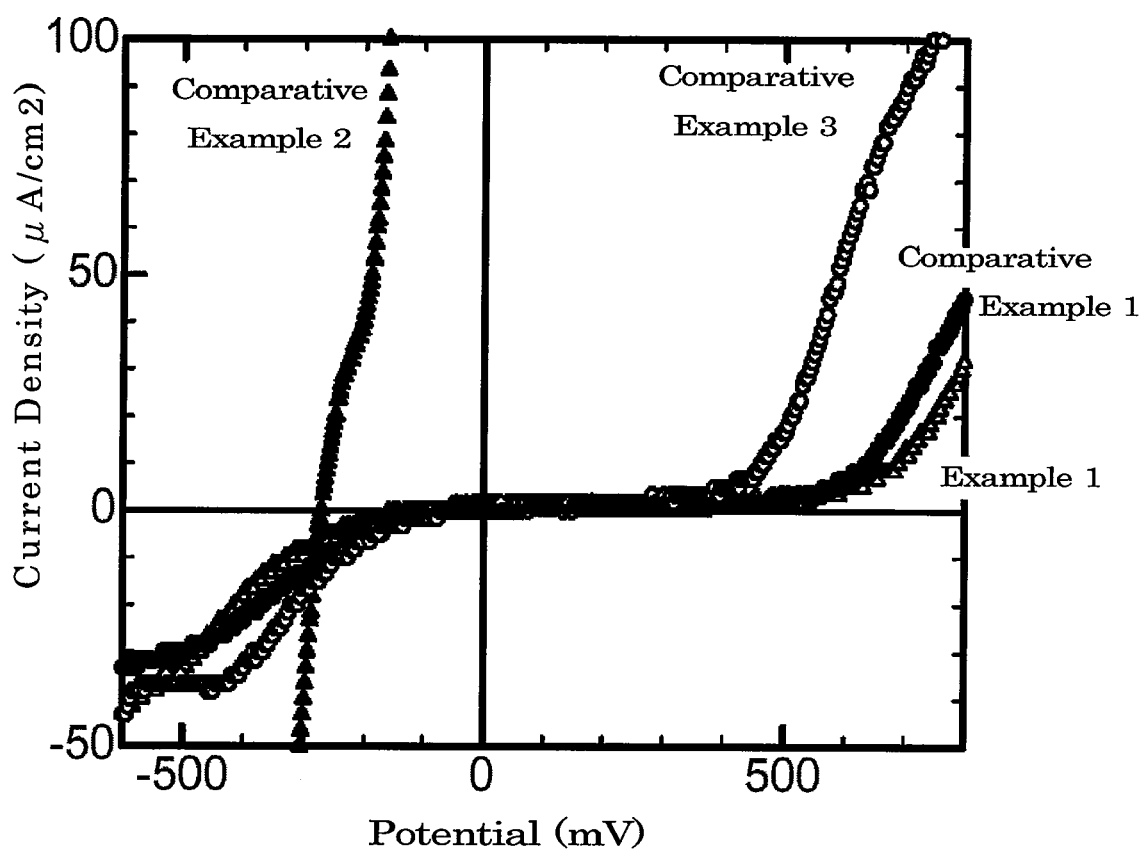
FIG. 1 is a potential-current curve in anodic polarization measurement.

It is an aspect of the present invention to provide an ink for ink-jet recording which, although comprises a free copper ion released from a copper complex coloring agent or the like, has anticorrosive properties and is free from the formation of the precipitate caused by the free copper ion.

The present inventor has found that, even when an ink for ink-jet recording comprises the free copper ion, the use of cyclohexylammonium carbamate as an anticorrosive in the ink may prevent the formation of a precipitate and may provide good anticorrosive properties.

An ink for ink-jet recording of the present invention comprises the free copper ion and cyclohexylammonium carbamate. No particular limitation is imposed on a material that comes the free copper ion. Examples of such a material include, without limitation, copper complex coloring agents such as copper phthalocyanine pigments and copper complex dyes (e.g., copper phthalocyanine dyes); other metal-containing dyes; and the like.

Although comprising the free copper ion, the ink for ink-jet recording of the present invention has good anticorrosive properties and is free from the formation of a precipitate caused by the free copper ion. Therefore, corrosion of an ink-jet head and clogging of nozzles may be prevented, so that the ejection stability of the ink may be improved.

Examples of the copper complex dyes include, without limitation, C.I. Direct Violets 47, 48, 90 and 91; C.I. Direct Blues 86, 87, 90, 98, 194, 195, 196, 199, 226 and 248; C.I. Direct Browns 95, 100, 112, 194 and 211; C.I. Direct Blacks 71, 105, 106, 107, 108 and 146; C.I. Acid Red 161; C.I. Acid Oranges 87, 88 and 122; C.I. Acid Reds 194, 209, 211, 215 and 216; C.I. Acid Blues 151, 154, 167, 168, 170, 171, 184, 187, 199, 229 and 234; C.I. Acid Greens 56, 57, 60 and 65; C.I. Acid Browns 231, 232, 294 and 296; C.I. Acid Blacks 58, 60, 62, 64, 107, 108, 112, 115, 118, 119, 121, 122, 131, 132, 139, 140, 155 and 156; C.I. Reactive Reds 6, 7, 27, 32 and 130; C.I. Reactive Violets 1, 2, 3, 4 and 5; C.I. Reactive Blues 3, 7, 9, 10, 13, 14, 15, 18, 20, 21, 25, 26, 38, 40, 41, 43, 52, 63, 71, 72, 77, 79, 80, 105, 113, 118, 120, 121, 122, 131, 140, 147 and 148; C.I. Reactive Browns 14, 18 and 19; C.I. Reactive Blacks 1, 8, 9, 13, 31 and 35; C.I. Reactive Greens 5, 12, 14 and 15; and the like. Of these, copper phthalocyanine dyes such as C.I. Direct Blue 199 is preferred in terms of color tone and light fastness.

Examples of the copper phthalocyanine pigments include, without limitation, C.I. Pigment Greens 7 and 36; C.I. Pigment Blues 15:x (wherein x is an integer from 1 to 6; e.g., C.I. Pigment Blue 15:1, C.I. Pigment Blue 15:3 and C.I. Pigment Blue 15:6); and the like.

When the ink for ink-jet recording comprises the copper phthalocyanine pigment, it is preferable to add a dispersing agent or a surfactant to the ink so that the copper phthalocyanine pigment is stably dispersed in the ink.

Examples of the dispersing agent include, without limitation, natural polymer dispersing agents and synthetic polymer dispersing agents. Examples of the natural polymer dispersing agents include, without limitation, proteins such as glue, gelatin, casein, albumin, and the like; natural rubbers such as gum Arabic, tragacanth gum, and the like; glucosides such as saponin, and the like; alginic acid derivatives such as alginic acid, propylene glycol alginate, triethanolamine alginate, ammonium alginate, and the like; cellulose derivatives such as methyl cellulose, carboxymethyl cellulose, hydroxyethyl cellulose, ethylhydroxy cellulose, and the like. Examples of the synthetic polymer dispersing agents include, without limitation, polyvinyl alcohol; polyvinyl pyrrolidone; acrylic resins such as polyacrylic acid, acrylic acid-acrylonitrile copolymers, potassium acrylate-acrylonitrile copolymers, vinyl acetate-acrylic ester copolymers, acrylic acid-acrylic ester copolymers, and the like; styrene-(meth)acrylic resins such as styrene-acrylic acid copolymers, styrene-methacrylic acid copolymers, styrene-methacrylic acid-acrylic ester copolymers, styrene-α-methylstyrene-acrylic acid copolymers, styrene-α-methylstyrene-acrylic acid-acrylic ester copolymers, and the like; vinyl acetate-based copolymers such as vinyl acetate-ethylene copolymers, vinyl acetate-fatty acid vinylethylene copolymers, vinyl acetate-maleic ester copolymers, vinyl acetate-crotonic acid copolymers, vinyl acetate-acrylic acid copolymers, and the like; styrene-maleic acid copolymers; styrene-maleic anhydride copolymers; vinyl naphthalene-acrylic acid copolymers; vinylnaphthalene-maleic acid copolymers; and salts thereof. Of these, copolymers of monomers having a hydrophobic group and monomers having a hydrophilic group and polymers composed of monomers having both hydrophobic and hydrophilic groups in their molecular structures are suitable.

Examples of the surfactant include, without limitation, anionic surfactants such as sodium dodecylbenzene sulfonate, sodium laurate, ammonium polyoxyethylene alkyl ether sulfate, and the like; and non-ionic surfactants such as polyoxyethylene alkyl ethers, polyoxyethylene alkyl esters, polyoxyethylene sorbitan fatty acid esters, polyoxyethylene alkylphenyl ethers, polyoxyethylene alkyl amines, polyoxyethylene alkyl amides, and the like.

When the ink for ink-jet recording comprises the copper phthalocyanine pigment, the copper phthalocyanine pigment may be a self-dispersing copper phthalocyanine pigment that may be dispersed in water without using a dispersing agent. Such a self-dispersing copper phthalocyanine pigment may be obtained by subjecting a copper phthalocyanine pigment to surface treatment such that at least one hydrophilic group such as a carbonyl group, a carboxyl group, a hydroxyl group or a sulfone group or a salt thereof is bonded to the surface of the pigment. For example, CAB-O-JET® 250 (product of Cabot Corporation) may be used as the self-dispersing copper phthalocyanine pigment.

The ink for ink-jet recording may comprise one or both of the copper phthalocyanine dye and the copper phthalocyanine pigment, as needed. An amount of the copper complex coloring agent may be appropriately determined according to the color imparted to the ink. The amount of the copper phthalocyanine dye may be in the range of from about 0.1 wt. % to about 8 wt. % with respect to the total amount of the ink. The amount of the copper phthalocyanine pigment may be in the range of from about 0.1 wt. % to about 8 wt. % with respect to the total amount of the ink. The total amount of the copper phthalocyanine dye and the copper phthalocyanine pigment may be in the range of from about 0.1 wt. % to about 8 wt. % with respect to the total amount of the ink.

The ink for ink-jet recording of the present invention may contain, in addition to the copper complex coloring agent described above, another coloring agent for color toning.

The ink for ink-jet recording of the present invention comprises cyclohexylammonium carbamate serving as an anticorrosive. Cyclohexylammonium carbamate is highly safe and exerts strong anticorrosive effects on a material, e.g., nickel, a 42-alloy (a nickel-iron alloy containing 42% nickel), SUS 430 and the like, used in an ink-jet head. In addition, cyclohexylammonium carbamate does not coordinate to the free copper ion, so that a precipitate is not formed. Therefore, a suitable amount of cyclohexylammonium carbamate may be determined in consideration of the required anticorrosive ability and does not depend on the amount of the free copper ion in the ink, and the amount may be in the range of from about 0.01 wt. % to about 2 wt. % with respect to the total amount of the ink.

The ink of ink-jet recording of the present invention comprises the free copper ion and cyclohexylammonium carbamate serving as an anticorrosive. The other components of the ink may be the same as those in known inks for ink-jet recording. For example, water, e.g., deionized water, is preferably used as the medium for the ink. A suitable amount of water depends on the types and compositions of the water soluble organic solvents used and on the desired properties of the ink and is determined over a wide range. The amount of water with respect to the total amount of the ink may be in the range of from about 10 wt. % to about 95 wt. %, and in the range of from about 10 wt. % to about 80 wt. %.

If necessary, water soluble organic solvents such as a humectant for preventing clogging of nozzles of an ink-jet head and a penetrant for allowing the printed ink to rapidly penetrate into a recording material are added to the ink for ink-jet recording.

Examples of the humectant include, without limitation, water soluble glycols such as glycerin, ethylene glycol, diethylene glycol, triethylene glycol, polyethylene glycol, propylene glycol, dipropylene glycol, tripropylene glycol, polypropylene glycol 1,5-pentanediol, 1,6-hexanediol, and the like. When the amount of the water soluble organic solvent serving as the humectant is too low, the clogging of nozzles of an ink-jet head is not effectively prevented. When the amount is too high, the viscosity of the ink increases to cause difficulty in ejecting the ink from an ink-jet head. Therefore, the amount of the humectant with respect to the total amount of the ink may be in the range of from about 5 wt. % to about 50 wt. %, and in the range of from about 10 wt. % to about 40 wt. %.

Examples of the penetrant include, without limitation, glycol ethers typified by ethylene glycol-based and propylene glycol-based alkyl ethers; and the like. Examples of the ethylene glycol-based alkyl ether include, without limitation, ethylene glycol methyl ether, ethylene glycol ethyl ether, ethylene glycol-n-propyl ether, ethylene glycol-n-butyl ether, ethylene glycol isobutyl ether, diethylene glycol methyl ether, diethylene glycol ethyl ether, diethylene glycol-n-propyl ether, diethylene glycol-n-butyl ether, diethylene glycol isobutyl ether, triethylene glycol methyl ether, triethylene glycol ethyl ether, triethylene glycol-n-propyl ether, triethylene glycol-n-butyl ether, triethylene glycol isobutyl ether, and the like. Examples of the propylene glycol-based alkyl ether include, without limitation, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, and the like. When the amount of the water soluble organic solvent serving as the penetrant is too low, the penetrability is insufficient. When the amount is too high, the penetrability becomes excessively high, so that bleeding such as feathering is likely to occur. Therefore, the amount of the penetrant with respect to the total amount of the ink may be in the range of from about 0.1 wt. % to about 10 wt. %, and in the range of from about 0.5 wt. % to about 7 wt. %.

The ink for ink-jet recording may further comprise, in addition to the humectant and the penetrant, another water soluble organic solvent for the purposes of, for example, preventing drying of the ink at the end portion of an ink-jet head, increasing the printing density, and obtaining vivid color. Examples of such a water soluble organic solvent include, without limitation, lower alcohols such as methyl alcohol, ethyl alcohol, n-propyl alcohol, isopropyl alcohol, n-butyl alcohol, sec-butyl alcohol, tert-butyl alcohol, and the like; amides such as dimethylformamide, dimethylacetamide, and the like; ketones and keto-alcohols such as acetone, diacetone alcohol and the like; ethers such as tetrahydrofuran, dioxane, and the like; glycerin; pyrrolidones such as 2-pyrrolidone, N-methyl-2-pyrrolidone, and the like; 1,3-dimethyl-2-imidazolidinone; and the like.

The ink for ink-jet recording of the present invention may comprise, if necessary, a known mildew proofing agent, a known pH modifier, and the like.

The ink for ink-jet recording of the present invention may be produced by uniformly mixing the coloring agent, water, the water soluble organic solvents and other additives used as needed by means of routine methods.

The ink for ink-jet recording of the present invention may be used in commercial ink-jet printers.

EXAMPLES

Example 1 and Comparative Examples 1 to 3

(1) Preparation of Inks

After the components of each composition summarized in Table 1 were mixed and stirred, the mixture was filtrated through a membrane filter of a hydrophilic PTFE (polytetrafluoroethylene) type (product of Toyo Roshi Kaisha, Ltd., pore size: 0.2 μm), whereby an ink for ink-jet recording was prepared.

In each of the inks of Example 1 and Comparative Examples 1 to 3, highly purified C.I. Direct Blue 199 was used, so that the concentration of the free copper ion in the ink was as low as 2 ppm or less.

(2) Anodic Polarization Measurement

A 42-alloy electrode serving as a working electrode, a platinum electrode serving as a counter electrode and a silver-silver chloride electrode serving as a reference electrode were attached to an electrochemical measurement system (HZ-3000, product of Hokuto Denko Corporation).

Subsequently, each of the inks of Example 1 and Comparative Examples 1 to 3 was held at 60° C. The working electrode and the counter electrode were immersed in the ink, and the reference electrode was immersed in a saturated potassium chloride solution. Then, the density of the current passing through the ink was measured while the potential was changed in the range of from −600 mV to 800 mV. The measured current density was evaluated by the criteria below. Note that it is desirable that an ink evaluated as "A" be used in actual ink-jet printers. The results are summarized in FIG. 1 and Table 1.

Evaluation Criteria:

A: The current density is 20 μA/cm$^2$ or less in the potential range of from −600 mV to 600 mV;

B: The current density is 20 μA/cm$^2$ or less in the potential range of from −600 mV to 400 mV; and C: The current density is more than 20 μA/cm$^2$ in the potential range of from −600 mV to 400 mV.

TABLE 1

| Composition | | | Example 1 | Comparative Example 1 | Comparative Example 2 | Comparative Example 3 |
|---|---|---|---|---|---|---|
| Coloring agent | C.I. Direct Blue 199 | (wt. %) | 3.5 | 3.5 | 3.5 | 3.5 |
| Humectant | Glycerin | (wt. %) | 25.0 | 25.0 | 25.0 | 25.0 |
| Penetrant | Triethylene glycol monobutyl ether | (wt. %) | 3.5 | 3.5 | 3.5 | 3.5 |
| Anticorrosive | Cyclohexylammonium carbamate | (wt. %) | 0.1 | — | — | — |
| | 1,2,3-Benzotriazole | (wt. %) | — | 0.1 | — | — |
| | Ethyl acid phosphate | (wt. %) | — | — | 0.1 | — |
| | Pure water | (wt. %) | 67.9 | 67.9 | 67.9 | 68.0 |
| Evaluation | Anodic polarization measurement | | A | A | C | B |

(3) Precipitate Caused by the Free Copper Ion

An aqueous solution of copper nitrate was added to each of the inks of Example 1 and Comparative Examples 1 to 3 to adjust the concentration of the free copper ion in the ink to 10 ppm, and the resultant ink was stirred for 30 minutes. In addition, two inks having free copper ion concentrations of 50 ppm and 100 ppm were produced by adjusting the free copper ion concentration of the ink of Example 1. After completion of the stirring, each of the resultant inks was filtrated through a membrane filter of a hydrophilic PTFE (polytetrafluoroethylen) type (product of Toyo Roshi Kaisha, Ltd., pore size: 0.2 μm). Then, the membrane filter was observed under a microscope to determine whether or not a precipitate was found. The results are summarized in Table 2.

TABLE 2

|  | Example 1a | Example 1b | Example 1c | Comparative Example 1a | Comparative Example 2a | Comparative Example 3a |
|---|---|---|---|---|---|---|
| Ink | Example 1 | Example 1 | Example 1 | Comparative Example 1 | Comparative Example 2 | Comparative Example 3 |
| Copper ion concentration (ppm) | 10 | 50 | 100 | 10 | 10 | 10 |
| Observation of precipitate | Not found | Not found | Not found | Found | Not found | Not found |

As can be seen from Tables 1 and 2, with the ink of Example 1 in which cyclohexylammonium carbamate was used as an anticorrosive, the corrosion of the 42-alloy was prevented, and a precipitate was not formed. However, with the inks of Comparative Examples 1 and 2 in which a different anticorrosive was used, and with the ink of Comparative Example 3 in which an anticorrosive was not used, one or both of the results of the precipitate test and of the anodic polarization measurements were not evaluated as satisfactory.

What is claimed is:

1. An ink for ink-jet recording comprising a free copper ion and an anticorrosive effective amount of cyclohexylammonium carbamate.

2. An ink for ink-jet recording according to claim 1, wherein the amount of cyclohexylammonium carbamate is in the range of from about 0.01 wt. % to about 2 wt. % with respect to the total amount of the ink.

3. An ink for ink-jet recording according to claim 1, comprising a copper complex coloring agent.

4. An ink for ink-jet recording according to claim 3, wherein the copper complex coloring agent is a copper phthalocyanine dye, a copper phthalocyanine pigment, or a combination thereof.

5. An ink for ink-jet recording according to claim 4, wherein an amount of the copper phthalocyanine dye, the copper phthalocyanine pigment, or combination thereof is in the range of from about 0.1 wt. % to about 8 wt. % with respect to the total amount of the ink.

* * * * *